3,242,125
DIENE POLYMER/STYRENE COPOLYMER
BLENDS PLASTICIZED WITH A SULFON-
AMIDE
George E. Walker, East Longmeadow, and Robert L.
Walter, Springfield, Mass., assignors to Monsanto Company, a corporation of Delaware
No Drawing. Filed Nov. 23, 1960, Ser. No. 71,158
11 Claims. (Cl. 260—30.8)

The invention relates to blends of a rubbery diene polymer and a resinous styrene-acrylonitrile type copolymer. More particularly, the invention relates to such blends having improved processability.

Known blends of rubbery diene polymers and resinous styrene-acrylonitrile type copolymers include both mechanical blends of the rubber and resin and blends wherein at least a portion of the rubber and resin are united in chemical combination. The latter type of blend is usually prepared by (1) dissolving the preformed rubber in a mixture of the resin-forming monomers, subsequently polymerizing the monomers to graft at least a portion thereof onto chains of the preformed rubber, and then optionally adding supplemental resin to adjust the rubber/resin ratio or (2) polymerizing the resin-forming monomer mixture in an aqueous dispersion of the preformed rubber and then optionally adding supplemental resin to adjust the rubber/resin ratio.

Both the purely mechanical blends and the blends in which there is some chemical combination between the rubbery and resinous components suffer the disadvantage of having poorer processability than the corresponding blends in which a styrene-type resin is employed instead of the styrene-acrylonitrile type resin. When conventional plasticizers are added to the blends to improve their processability, the improvement in processability is accomplished only at the expense of unduly sacrificing the good physical properties of the blends, particularly the tensile strength.

One object of this invention is to provide improved blends of a rubbery diene polymer and a resinous styrene-acrylonitrile type copolymer.

Another object is to provide a method of improving the processability of blends of a rubbery diene polymer and a resinous styrene-acrylonitrile type copolymer.

A further object is to provide a method of improving the processability of such blends without unduly sacrificing their good tensile properties.

These and other objects are attained by modifying a rubbery diene polymer/resinous styrene-acrylonitrile type copolymer blend containing 5–40% by weight of the rubbery diene polymer by incorporating therein 1–20%, based on the weight of the rubber-resin blend, of a sulfonamide having a melting point not higher than about 260° C. and corresponding to the general formula:

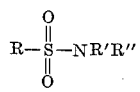

wherein R represents a hydrocarbon radical and R' and R'' are independently selected from the group consisting of hydrogen atoms and hydrocarbon radicals.

The following examples are given to illustrate the invention. Parts, percentages, and ratios mentioned are parts, percentages, and ratios by weight.

EXAMPLE I

Part A.—Preparation of rubber

A rubber latex is prepared from the following polymerization recipe.

| Component: | Parts |
|---|---|
| Water | 200 |
| Butadiene-1,3 | 90 |
| Styrene | 10 |
| Divinyl benzene | 0.75 |
| Sodium stearate | 5 |
| t-Dodecyl mercaptan | 0.4 |
| Potassium persulfate | 0.3 |

The water and sodium stearate are charged to a suitable, agitated reaction vessel, deoxygenated by boiling, and cooled under nitrogen. The remaining components are then added to the vessel, and the reaction mixture is heated at 60° C. for about 14 hours. The batch is cooled and stripped of unreacted monomers.

Part B.—Preparation of graft copolymer

The rubber latex of Part A is used in preparing a graft copolymer latex. An aliquot of the rubber latex containing 100 parts of rubber solids is purged with nitrogen, 50 parts of an 80:20:0.5 mixture of styrene, acrylonitrile, and t-dodecyl mercaptan are added to the purged latex, and a solution of 0.1 part of potassium persulfate in 55 parts of water is then added. The reaction mixture is heated at 70° C. with agitation for 3 hours in an inert atmosphere, cooled, and stabilized by the addition of 2 parts of a styrenated phenol antioxidant.

Part C.—Preparation of resin

Four resinous styrene-acrylonitrile copolymers are prepared in the following manner. A solution of 2 parts of sodium stearate in 150 parts of water is charged to a suitable, agitated reaction vessel, deoxygenated by boiling, and cooled under nitrogen. A styrene/acrylonitrile/t-dodecyl mercaptan mixture and a solution of 0.25 part of potassium persulfate in 50 parts of water are then separately and continuously charged to the agitated vessel over a period of 2 hours, with an inert atmosphere and a reaction temperature of 95–100° C. being maintained throughout the addition. After completion of this addition, the reaction mixture is cooled to terminate the reaction.

The amounts of styrene (S), acrylonitrile (AN), and t-dodecyl mercaptan (TDDM) used in the preparation of each of the resins and the specific viscosities (Sp. Vis.) of the resins, in each case measured as a solution of 0.1% of the polymer in dimethylformamide at 20° C., are as follows:

| Resin | S | AN | TDDM | Sp. Vis. |
|---|---|---|---|---|
| A | 72 | 28 | 0.4 | 0.060 |
| B | 80 | 20 | 0.3 | 0.068 |
| C | 80 | 20 | 0.2 | 0.074 |
| D | 85 | 15 | 0.3 | 0.054 |

The rubber and resin latices prepared in Example I are used in preparing the polyblends of the subsequent examples. Unless otherwise stated, the following procedure is followed in preparing and testing these polyblends.

PROCEDURE

The graft copolymer latex of Part B of Example I is combined with one of the resin latices of Part C in such proportions that the rubber substrate of the graft copolymer constitutes 20% of the total solids. The mixed latices are drum dried, and the recovered solids are mill rolled for 4 minutes on a two-roll rubber mill having the front roll temperature set at 150° C. and the rear roll temperature set at 125° C. The milled polyblend is ground to a fine powder, extruded at 218° C., cooled in a water bath, and injection molded at 205° C.

The minimum molding pressure at 185° C., an indication of the processability of the polyblend, is determined by molding samples of the polyblend, first at 1200 p.s.i. and then at gradually decreasing pressures, until an incomplete specimen for testing tensile properties is formed. The lowest pressure at which a complete specimen for testing tensile properties is formed is the minimum molding pressure.

The tensile properties of the polyblend are determined in accordance with ASTM test D638–52T.

EXAMPLE II

Polyblends A, B, C, and D are prepared from the graft copolymer latex and Resin D latex. The procedure described above is followed with the exception that Polyblends B, C, and D are modified by tumble-blending 100 parts of each of the ground polyblends with 4 parts of a processing aid for 30 minutes prior to extrusion. The processing aids employed are:

Polyblend A—none
Polyblend B—dioctyl phthalate
Polyblend C—a commercial mixture of N-ethyl-p-toluene sulfonamide and N-ethyl-o-toluene sulfonamide
Polyblend D—N-ethyl-p-toluene sulfonamide The minimum molding pressures at 185° C. (MMP) and the tensile properties of the polyblends are shown in Table I.

TABLE I

| Polyblend | A | B | C | D |
|---|---|---|---|---|
| MMP (p.s.i.) | 850 | 675 | 675 | 550 |
| Tensile strength (p.s.i.): | | | | |
| At Yield | 5,500 | 4,600 | 5,200 | 5,300 |
| At Fail | 4,800 | 3,700 | 4,200 | 4,500 |
| Tensile Elongation, percent: | | | | |
| At Yield | 3 | 2.6 | 2.6 | 2.8 |
| At Fail | 16 | 9 | 10 | 8 |

As shown in the above table, the sulfonamides of the invention are as effective as dioctyl phthalate in improving the processability of the rubber-resin blends, as indicated by the decrease in minimum molding pressure at 185° C., and they have the advantage of improving the processability without causing as drastic a reduction in the tensile strengths of the blends. Similar results are obtained when the following polyblends are modified by incorporating these processing aids:

I.—Blend of 20 parts of a rubbery butadiene-acrylonitrile (90:10) copolymer and 80 parts of Resin D.
II.—Blend of Resin B with a graft copolymer prepared by dissolving 10 parts of a rubbery butadiene-styrene (60:40) copolymer in 90 parts of a 72:28 mixture of styrene and acrylonitrile monomers and polymerizing the solution in the presence of 0.03 part of benzoyl peroxide at 60° C. to substantially complete conversion of monomers to polymer. The resin and graft copolymer are mixed in such proportions that the rubber substrate of the graft copolymer constitutes 30% of the blend.

EXAMPLE III

Polyblends E, F, and G are prepared from the graft copolymer latex of Example I and Resin A latex. The procedure described above is followed with the exception that 100 parts of each of the ground Polyblends F and G are tumble-blended wtih a commercial mixture of N-ethyl-p-toluene sulfonamide and N-ethyl-o-toluene sulfonamide for 30 minutes prior to extrusion. The amounts of processing aid employed are:

| | Parts |
|---|---|
| Polyblend E | None |
| Polyblend F | 2.5 |
| Polyblend G | 5 |

The minimum molding pressures at 185° C. (MMP) and the tensile properties of the polyblends are shown in Table II.

TABLE II

| Polyblend | E | F | G |
|---|---|---|---|
| MMP (p.s.i.) | 1,000 | 890 | 775 |
| Tensile strength (p.s.i.): | | | |
| At Yield | 5,800 | 5,500 | 5,400 |
| At Fail | 4,900 | 4,700 | 4,500 |
| Tensile elongation (percent): | | | |
| At Yield | 3 | 2.8 | 2.4 |
| At Fail | 40 | 13 | 13 |

As shown in the above table, the minimum molding pressure at 185° C. decreases with increasing amounts of sulfonamide processing aid. This result is also observed when the following sulfonamides are employed as processing aids: methane sulfonamide, ethylene sulfonamide, N-cyclohexyl-p-toluene sulfonamide, and N,N-dimethyl-p-toluene sulfonamide.

EXAMPLE IV

Polyblends H and I are prepared from the graft copolymer latex of Example I and Resin B latex. The procedure described above is followed with the exception that 100 parts of ground Polyblend I are tumble-blended with 4 parts of a commercial mixture of o-toluene sulfonamide and p-toluene sulfonamide for 30 minutes prior to extrusion. The minimum molding pressures at 185° C. (MMP) and the tensile properties of the polyblends are shown in Table III.

TABLE III

| Polyblend | H | I |
|---|---|---|
| MMP (p.s.i.) | 1,025 | 775 |
| Tensile strength (p.s.i.): | | |
| At Yield | 5,700 | 5,700 |
| At Fail | 4,800 | 5,400 |
| Tensile elongation (percent): | | |
| At Yield | 3.2 | 2.9 |
| At Fail | 25 | 4.0 |

EXAMPLE V

Resin C' is prepared by repeating the preparation of Resin C with the exception that about 5.4 parts of a commercial mixture of N-ethyl-p-toluene sulfonamide and N-ethyl-o-toluene sulfonamide are continuously added to the reaction mixture during the addition of the monomer mixture and catalyst solution.

Polyblends J and K are prepared from the graft copolymer latex of Example I and Resin C and Resin C' latices, respectively, using the procedure described above. Polyblend K contains about 3.8 parts of the processing aid per 100 parts of rubber-resin blend. The minimum molding pressures at 185° C. and the tensile properties of the polyblends are shown in Table IV.

TABLE IV

| Polyblend | J | K |
|---|---|---|
| MMP (p.s.i.) | 1,025 | 850 |
| Tensile strength (p.s.i.): | | |
| At Yield | 6,200 | 5,900 |
| At Fail | 5,200 | 5,100 |
| Tensile elongation (percent): | | |
| At Yield | 3.3 | 2.6 |
| At Fail | 20 | 37 |

This example demonstrates that the processing aids of the invention can be incorporated into the polyblends by addition to the reaction mixture during the copolymerization of the styrene and acrylonitrile monomers instead of by extrusion blending with the rubber-resin blend. As shown in the above table, incorporation of the processing aid in this manner effects the same result of improving processability without unduly decreasing tensile strength. Similar results are observed when the processing aid is incorporated by mill rolling it with the polyblend, by adding it to the mixed rubber and resin latices and coagulating it therewith, or by adding it to the reaction mixture during the grafting of the monomer mixture onto the rubber substrate.

The process of the invention is a method of improving the processability of rubbery diene polymer/resinous styrene-acrylonitrile type copolymer blends containing 5–40% by weight of the rubbery diene polymer by incorporating therein 1–20%, based on the weight of the polyblend, of a sulfonamide having a melting point not higher than about 260° C. and corresponding to the general formula:

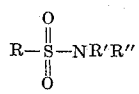

wherein R represents a hydrocarbon radical and R' and R" are independently selected from the group consisting of hydrogen atoms and hydrocarbon radicals.

The invention is applicable to the modification of both mechanical blends of the rubber and resin and blends in which there is some chemical combination between the rubbery and resinous components. Both types of blend are already well known to those skilled in the art.

The latter type of blend, usually called a graft copolymer blend, can be prepared by dissolving the preformed rubber in a mixture of the resin-forming monomers and subsequently polymerizing the monomers or, alternatively, by polymerizing the mixture of resin-forming monomers in an aqueous dispersion of the preformed rubber. In the preparation of these graft copolymer blends, all of the resin-forming monomers can be polymerized in the presence of the preformed rubber, or one portion of the resin-forming monomer mixture can be polymerized separately and then be blended with the graft copolymer prepared by polymerizing the remainder of the resin-forming monomer mixture in the presence of the preformed rubber. Various techniques for preparing these graft copolymer blends are described in the art.

Among the preferred blends which are modified in accordance with the present invention are the fusion blends obtained by comalaxating a binary mixture of the resinous copolymer and a graft copolymer prepared by polymerizing 15–90 parts by weight of the mixture of resin-forming monomers in an aqueous dispersion containing 100 parts by weight of the preformed rubber in the absence of any emulsifying agent other than that employed in the preparation of the preformed rubber.

The rubbery diene polymer which constitutes a component of the rubber-resin blends is a (co)polymer of 50–100% by weight of a conjugated diene hydrocarbon, 0–50% by weight of a copolymerizable monovinylidene aromatic hydrocarbon, 0–10% by weight of other copolymerizable monoethylenically unsaturated compounds, and 0–3%, preferably 0.1–1.5%, by weight of a cross-linking agent.

Particularly suitable conjugated diene hydrocarbons are butadiene-1,3, isoprene, and mixtures thereof. Monovinylidene aromatic hydrocarbons suitable as components of the rubbery polymers include styrene, alpha-methyl styrene, o-, m-, and p-methyl styrenes, o-, m-, and p-methyl-alpha-methyl styrenes, vinyl naphthalene, etc., and mixtures thereof. Exemplary of other copolymerizable monoethylenically unsaturated compounds are ar-chlorostyrenes, acrylic compounds such as acrylonitrile, methacrylonitrile, methyl methacrylate, butyl acrylate, etc., vinyl esters such as vinyl acetate, etc., and mixtures thereof. Among the suitable cross-linking agents are copolymerizable polyunsaturated compounds containing terminal ethylenic groups as the only ethylenic unsaturation, e.g., divinyl benzene, diallyl maleate, diallyl fumarate, diallyl phthalate, diallyl adipate, allyl acrylate, allyl methacrylate, ethylene gycol dimethacrylate and other esters of acrylic or methacrylic acid with polyhydric alcohols, etc.

The resinous copolymer which constitutes a component of the rubber-resin blends is a copolymer of 65–90% by weight of a monovinylidene aromatic hydrocarbon (e.g., styrene, alpha-methyl styrene, o-, m-, and p-methyl styrenes, o-, m-, and p-methyl-alpha-methyl styrenes, vinyl naphthalene, etc., and mixtures thereof) and, correspondingly, 35–10% by weight of an unsaturated nitrile of the group consisting of acrylonitrile, methacrylonitrile, and mixtures thereof. The copolymers can include minor amounts of a chain-transfer agent of the type frequently incorporated during the preparation of styrene-acrylonitrile type copolymers to regulate the molecular weight, e.g., a higher alkyl mercaptan such as t-dodecyl mercaptan, alpha-methyl styrene dimer, etc.

Sulfonamides utilizable in the practice of the invention are the liquid and solid sulfonamides having melting points not higher than about 260° C. and corresponding to the general formula:

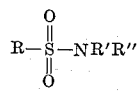

wherein R represents a hydrocarbon radical and R' and R" are independently selected from the group consisting of hydrogen atoms and hydrocarbon radicals. Exemplary of utilizable sulfonamides are:

(1) Alkane sulfonamides, such as methane sulfonamide, ethane sulfonamide, 1-propane sulfonamide, 1-butane sulfonamide, etc., (2) Alkene sulfonamides, such as ethylene sulfonamide, etc., (3) Aralkane sulfonamides, such as phenylmethane sulfonamide, phenylethane sulfonamide, etc., (4) Aromatic sulfonamides, such as benzene sulfonamide, the 1- and 2-naphthalene sulfonamides, the o-, m-, and p-toluene sulfonamides, etc., (5) N-substituted sulfonamides, such as N-methyl-p-toluene sulfonamide, N-ethyl-o-toluene sulfonamide, N-ethyl-p-toluene sulfonamide, N-butyl-p-toluene sulfonamide, N-cyclohexyl-p-toluene sulfonamide, etc., and (6) N,N-disubstituted sulfonamides, such as N,N-dimethyl-p-toluene sulfonamide, N-methyl-N-phenyl-p-toluene sulfonamide, etc.

Mixtures of two or more of such sulfonamides can be employed if desired. The particular sulfonamide or mixture of sulfonamides to be employed as a processing aid in the practice of the invention should be chosen with regard to the temperature at which the polyblend is to be processed, usually a temperature in the range of 150–285° C. The melting point of the sulfonamide processing aid should be at least 25° C. lower than the processing temperature, and its boiling point should be higher than the processing temperature.

The amount of sulfonamide incorporated into the rubber-resin blend can vary from about 1–20%, based on the weight of the polyblend (i.e., the combined weights of rubber and resin), but it is usually preferred to use amounts less than 10%, or even more preferably less than 6%, because the heat distortion temperatures of the polyblends are usually lowered and their tensile strengths usually decrease with increasing amounts of processing aid employed. However, since the minimum molding pressure at which the polyblend can be molded at a given temperature also decreases with increasing amounts of processing aid employed, it is sometimes desirable to exceed the usually preferred amounts of processing aid when the heat distortion temperature and tensile strength of the polyblends are not very critical factors or when the tensile strength is not substantially lowered by the incorporation of large amounts of processing aid.

The sulfonamide processing aid can be incorporated into the rubber-resin blend by any suitable method, e.g., by extrusion blending with polyblend solids, mill rolling with polyblend solids, addition to polyblend latex and co-coagulation therewith, addition to the reaction mixture during the copolymerization of the styrene and acrylonitrile type monomers, addition to the reaction mixture during the grafting of the styrene-acrylonitrile type monomer mixture onto a preformed rubber substrate, etc.

The sulfonamide-containing rubber-resin blends of the invention can be modified by conventional additives such as stabilizers, antioxidants, fillers, colorants, etc., if desired.

The invention is advantageous in that the incorporation of the sulfonamide processing aid improves the processability of the rubbery diene polymer/resinous styrene-acrylonitrile type copolymer blends without unduly lowering their tensile strengths, whereas conventional plasticizers can improve the processability only at the expense of unduly lowering the tensile strengths.

It is obvious that many variations can be made in the products and processes set forth above without departing from the spirit and scope of this invention.

What is claimed is:

1. A composition comprising an intimate mixture of (1) a blend of 5–40 parts by weight of a rubbery diene polymer and, correspondingly, 95–60 parts by weight of a resinous copolymer of 65–90% by weight of a monovinylidene aromatic hydrocarbon and 35–10% by weight of an unsaturated nitrile of the group consisting of acrylonitrile, methacrylonitrile, and mixtures thereof and (2) 1–20%, based on the weight of said blend, of a sulfonamide having a melting point not higher than 260° C. and corresponding to the general formula:

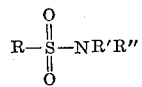

wherein R represents a hydrocarbon radical and R' and R'' are independently selected from the group consisting of hydrogen atoms and hydrocarbon radicals.

2. A composition as in claim 1 wherein the blend is a mechanical mixture of the rubbery polymer and the resinous copolymer.

3. A composition as in claim 1 wherein the sulfonamide is N-ethyl-p-toluene sulfonamide.

4. A composition as in claim 1 wherein the sulfonamide is a mixture of N-ethyl-o-toluene sulfonamide and N-ethyl-p-toluene sulfonamide.

5. A composition as in claim 1 wherein the sulfonamide is a mixture of o-toluene sulfonamide and p-toluene sulfonamide.

6. A composition as in claim 1 wherein the sulfonamide is N-cyclohexyl-p-toluene sulfonamide.

7. A composition comprising an intimate mixture of (1) a blend of a resinous styrene-acrylonitrile copolymer containing 65–90% by weight of combined styrene and 35–10% by weight of combined acrylonitrile and a graft copolymer prepared by polymerizing 15–90 parts by weight of a monomer mixture consisting of 65–90% by weight of styrene and 35–10% by weight of acrylonitrile in an aqueous dispersion containing 100 parts by weight of a rubbery butadiene-styrene copolymer containing about 90% by weight of combined butadiene, about 10% by weight of combined styrene, and up to about 1.5% by weight of a cross-linking agent in the absence of any emulsifying agent other than that employed in the preparation of the rubbery butadiene-styrene copolymer and (2) 1–6%, based on the weight of the blend, of a mixture of N-ethyl-o-toluene sulfonamide and N-ethyl-p-toluene sulfonamide.

8. A composition comprising an intimate mixture of (1) a blend of a resinous styrene-acrylonitrile copolymer containing 65–90% by weight of combined styrene and 35–10% by weight of combined acrylonitrile and a graft copolymer prepared by polymerizing 15–90 parts by weight of a monomer mixture consisting of 65–90% by weight of styrene and 35–10% by weight of acrylonitrile in an aqueous dispersion containing 100 parts by weight of a rubbery butadiene-styrene copolymer containing about 90% by weight of combined butadiene, about 10% by weight of combined styrene, and up to about 1.5% by weight of a cross-linking agent in the absence of any emulsifying agent other than that employed in the preparation of the rubbery butadiene-styrene copolymer and (2) 1–6%, based on the weight of the blend, of N-cyclohexyl-p-toluene sulfonamide.

9. A composition comprising an intimate mixture of (1) a blend of (a) a resinous copolymer of 65–90% by weight of a monovinylidene aromatic hydrocarbon and 35–10% by weight of an unsaturated nitrile of the group consisting of acrylonitrile, methacrylonitrile, and mixtures thereof and (b) a graft copolymer prepared by polymerizing a monomer mixture consisting of 65–90% by weight of a monovinylidene aromatic hydrocarbon and 35–10% by weight of an unsaturated nitrile of the group consisting of acrylonitrile, methacrylonitrile, and mixtures thereof in the presence of a preformed rubbery diene polymer; said resinous copolymer and graft copolymer being so proportioned that the rubbery component of the graft copolymer constitutes 5–40% by weight of the blend and (2) 1–20%, based on the weight of said blend, of a sulfonamide having a melting point not higher than 260° C. and corresponding to the general formula:

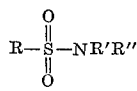

wherein R represents a hydrocarbon radical and R' and R'' are independently selected from the group consisting of hydrogen atoms and hydrocarbon radicals.

10. The composition of claim 9 wherein the graft copolymer is a graft copolymer prepared by dissolving the rubbery diene polymer in the monovinylidene aromatic hydrocarbon-unsaturated nitrile monomer mixture and then polymerizing the monomer mixture.

11. The composition of claim 9 wherein the graft copolymer is a graft copolymer prepared by polymerizing the monovinylidene aromatic hydrocarbon-unsaturated nitrile monomer mixture in an aqueous dispersion containing the rubbery diene polymer.

(References on following page)

References Cited by the Examiner

UNITED STATES PATENTS

| | | | |
|---|---|---|---|
| 2,491,936 | 12/1949 | Schlattman | 260—30.8 |
| 2,545,174 | 3/1951 | Sido | 260—556 |
| 2,643,987 | 6/1953 | Harrison et al. | 260—45.5 |
| 2,757,156 | 7/1956 | Dazzi | 260—30.8 |
| 2,834,749 | 5/1958 | Salyer et al. | 260—30.8 |
| 2,855,375 | 10/1958 | Dobay | 260—30.8 |
| 2,861,002 | 11/1958 | Britton | 260—30.8 |
| 2,872,430 | 2/1959 | Parker et al. | 260—30.8 |
| 2,980,640 | 4/1961 | Shoemaker et al. | 260—45.5 |
| 3,073,798 | 1/1963 | Baer | 260—45.5 |
| 3,075,928 | 1/1963 | Lanham | 260—30.8 |

OTHER REFERENCES

Buttrey: Plasticizers; Cleaver-Hume Press, Ltd.; 2d ed.; 1957; pages 105–107.

Mellon: The Behavior of Plasticizers; Pergamon Press; 1961; pages 58–60.

Monsanto Chemical Company, "Chemicals, Plastics and Petroleum Products," St. Louis, Mo. (1955), pages 54 and 55.

MORRIS LIEBMAN, *Primary Examiner.*

DANIEL ARNOLD, ALEXANDER H. BRODMERKEL, *Examiners.*

L. G. KASTRINER, A. O. DENT, L. T. JACOBS,
*Assistant Examiners.*